(12) United States Patent
Bell et al.

(10) Patent No.: US 6,795,743 B1
(45) Date of Patent: Sep. 21, 2004

(54) APPARATUS AND METHOD FOR ELECTRONICALLY ENCODING AN ARTICLE WITH WORK-IN-PROGRESS INFORMATION

(75) Inventors: James S. Bell, Austin, TX (US); Michael L. Berry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 646 days.

(21) Appl. No.: 09/663,997

(22) Filed: Sep. 18, 2000

(51) Int. Cl.$^7$ .............................................. G06F 19/00
(52) U.S. Cl. ..................................... 700/115; 700/109
(58) Field of Search ................. 700/115–121, 108–110; 714/718, 733–743; 324/537, 759, 763–765; 438/14–18

(56) References Cited

U.S. PATENT DOCUMENTS

| | | | |
|---|---|---|---|
| 3,961,254 A | | 6/1976 | Cavaliere et al. ........... 714/730 |
| 4,074,189 A | | 2/1978 | Harms et al. ................ 714/740 |
| 4,437,229 A | | 3/1984 | Bitler et al. .................. 29/593 |
| 4,451,903 A | | 5/1984 | Jordan ......................... 365/94 |
| 4,714,875 A | | 12/1987 | Bailey et al. .............. 324/73.1 |
| 4,888,549 A | | 12/1989 | Wilson et al. ............. 324/73.1 |
| 4,908,576 A | | 3/1990 | Jackson ....................... 714/726 |
| 4,942,534 A | * | 7/1990 | Yokoyama et al. ............ 700/9 |
| 4,975,876 A | | 12/1990 | Haulin ......................... 365/94 |
| 5,003,251 A | | 3/1991 | Fuoco ......................... 324/764 |
| 5,043,657 A | | 8/1991 | Amazeen et al. ............. 438/18 |
| 5,289,113 A | * | 2/1994 | Meaney et al. ............ 324/73.1 |
| 5,301,143 A | * | 4/1994 | Ohri et al. ..................... 365/96 |
| 5,353,230 A | * | 10/1994 | Maejima et al. ............ 700/115 |
| 5,654,902 A | * | 8/1997 | Scheidt et al. ................ 702/82 |
| 5,818,848 A | | 10/1998 | Lin et al. ..................... 714/718 |
| 5,984,190 A | * | 11/1999 | Nevill ......................... 235/492 |
| 6,078,845 A | * | 6/2000 | Friedman .................... 700/104 |
| 6,246,919 B1 | * | 6/2001 | Hassel ......................... 700/116 |
| 6,365,421 B2 | * | 4/2002 | Debenham et al. ........... 438/14 |
| 6,368,901 B2 | * | 4/2002 | Gelsomini et al. .......... 438/131 |

* cited by examiner

*Primary Examiner*—Maria N. Von Buhr
(74) *Attorney, Agent, or Firm*—Haynes and Boone, LLP

(57) ABSTRACT

A method for electronically encoding an article with work-in-progress information includes determining a work-in-progress condition of the article and setting an encoding device attached to the article to a set-point corresponding to the work-in-progress condition. Determining the work-in-progress condition includes identifying a present work-in-progress condition of the article and at least one historical work-in-progress condition of the article. Adjusting the encoding device includes adjusting the encoding device from a first set-point of a first set-point set to a first set-point of a second set-point set in response to passing a first work-in-progress evaluation, and adjusting the encoding device from the first set-point of the second set-point set to a second set-point of the first set-point set in response to failing a second work-in-progress evaluation after passing the first work-in-progress evaluation. The present work-in-progress information and historical work-in-progress information of the article are used to effectively estimate the reliability and improve the manufacturability of the article.

25 Claims, 7 Drawing Sheets

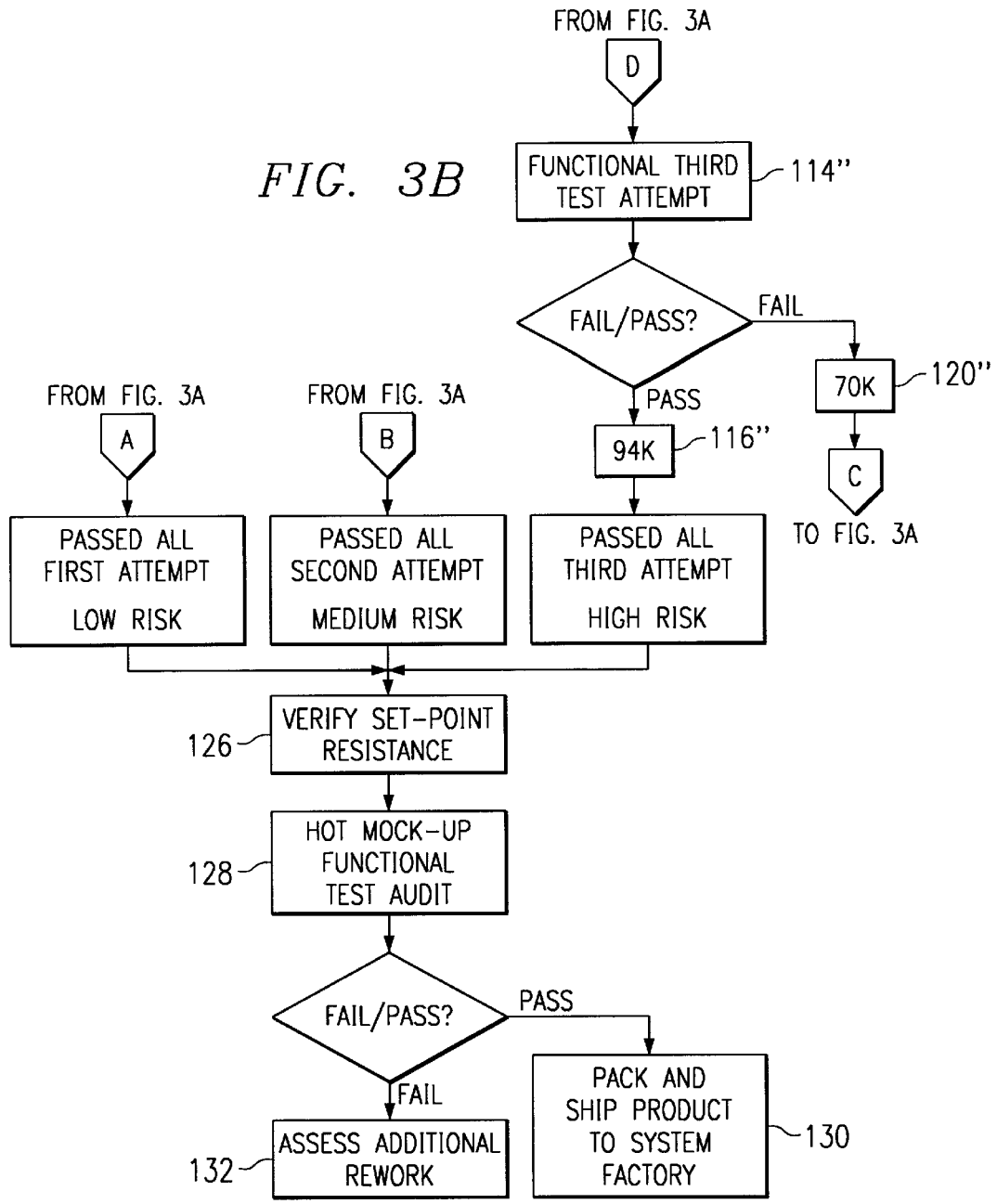

Fig. 4A 200

S1 {
- OK   freshly assembled, Pre-ICT checks the ability to set the parts resistance, if pass, then set to 1K ohms
- 1K   Set at this value if initial Digital Potentiometer portion of test has passed, subsequent ICT tests will read this or higher values
- 2K   UNIT FAILED FIRST ICT TEST ATTEMPT, GROSS FAILURE
- 3K   UNIT FAILED SECOND ICT TEST ATTEMPT, GROSS FAILURE
- 4K   UNIT FAILED THIRD ICT TEST ATTEMPT, GROSS FAILURE, UNIT MAY BE SCRAP

S2 {
- 10K   Failed ICT once, Test Probe Nails test failure
- 12K   Failed Shorts Test
- 14K   Failed Opens Test
- 16K   Failed Power-up test
- 18K   Failed logic table test

- 20K   Failed ICT Test Probe Nails, (Twice)
- 22K   Failed Shorts Test (Twice)
- 24K   Failed Opens Test (Twice)
- 26K   Failed Power-up test (Twice)
- 28K   Failed Logic table test (Twice)

- 30K   Failed ICT Test Probe Nails (Three Times) --------------- SCRAP BOARD
- 32K   Failed Shorts Test (Three Times) ------------------------ SCRAP BOARD
- 34K   Failed Opens Test (Three Times) ------------------------- SCRAP BOARD
- 36K   Failed Power-Up test (Three Times) ---------------------- SCRAP BOARD
- 38K   Failed Logic Table Test (Three Times) ------------------- SCRAP BOARD
- 39K   SCRAP...REFUSE TO PERFORM ICT PROPERLY S3 {
- 40K PASSED ICT   FIRST ICT PASS UNIT ------- LOW RISK RELIABILITY UNIT
- 42K              SECOND ICT PASS UNIT ----- MEDIUM RISK RELIABILITY UNIT
- 44K              THIRD ICT PASS UNIT ------ HIGH RISK RELIABILITY UNIT - CHECK DATE CODE
- 46K              FOUR + ICT PASS UNIT ---- VERY HIGH RISK RELIABILITY UNIT - CHECK DATE CODE

FROM FIG. 4A

S4 {
- 50K    FAILED FUNCTIONAL TEST, POST Failure, FIRST ATTEMPT
- 52K    FAILED DOS BOOT, FIRST Functional Test Attempt
- 54K    FAILED WINDOWS TESTING, First Functional Test Attempt
- 56K    FAILED PROGRAMMED PARTS TESTS (MAC, BIOS, CMOS, ASSET TAG), First Functional Test Attempt
- 58K    FAILED JUMPERS/Presence TESTS, First Functional Test Attempt

- 60K    FAILED FUNCTIONAL TEST, POST Failure, SECOND ATTEMPT
- 62K    FAILED DOS BOOT, SECOND Functional Test Attempt
- 64K    FAILED WINDOWS TESTING, Second Functional Test Attempt
- 66K    FAILED PROGRAMMED PARTS TESTS (MAC, BIOS, CMOS, ASSET TAG), Second Functional Test Attempt
- 68K    FAILED JUMPERS/Presence TESTS, Second Functional Test Attempt

- 70K    FAILED FUNCTIONAL TEST, POST Failure, THIRD ATTEMPT
- 72K    FAILED DOS BOOT, THIRD Functional Test Attempt
- 74K    FAILED WINDOWS TESTING, Third Functional Test Attempt
- 76K    FAILED PROGRAMMED PARTS TESTS (MAC, BIOS, CMOS, ASSET TAG), Third Functional Test Attempt
- 78K    FAILED JUMPERS/Presence TESTS, Third Functional Test Attempt
- 79K    SCRAP...REFUSE TO PERFORM FUNCTIONAL TEST PROPERLY
}

S5 {
- 80K    FIRST FT PASS UNIT ------- LOW RISK RELIABILITY UNIT
- 82K    SECOND FT PASS UNIT ----- MEDIUM RISK RELIABILITY UNIT
- 84K    THIRD FT PASS UNIT ------- HIGH RISK RELIABILITY UNIT- CHECK DATE CODE
- 86K    FOUR + FT PASS UNIT ----- VERY HIGH RISK RELIABILITY UNIT- CHECK DATE CODE
}

S6 {
- 90K    PASSED ALL Automated ICT and Functional Tests, First Pass ------- LOW RISK RELIABILITY UNIT
- 92K    PASSED ALL Automated ICT and Functional Tests, Was rejected from FT to ICT Twice ------------------ MEDIUM RISK RELIABILITY UNIT
- 94K    PASSED ALL Automated ICT and Functional Tests, Was rejected from FT to ICT Three Times ------------ HIGH RISK RELIABILITY UNIT- CHECK DATE CODE
- 96K    PASSED ALL Automated ICT and Functional Tests, Was rejected from FT to ICT 4 + Times ------------- HIGH RISK RELIABILITY UNIT- CHECK DATE CODE
- 98K    PASSED ALL Automated ICT and Functional Tests, Was rejected from FT to ICT 4 + Times ------------- VERY HIGH RISK RELIABILITY UNIT- CHECK DATE CODE
}

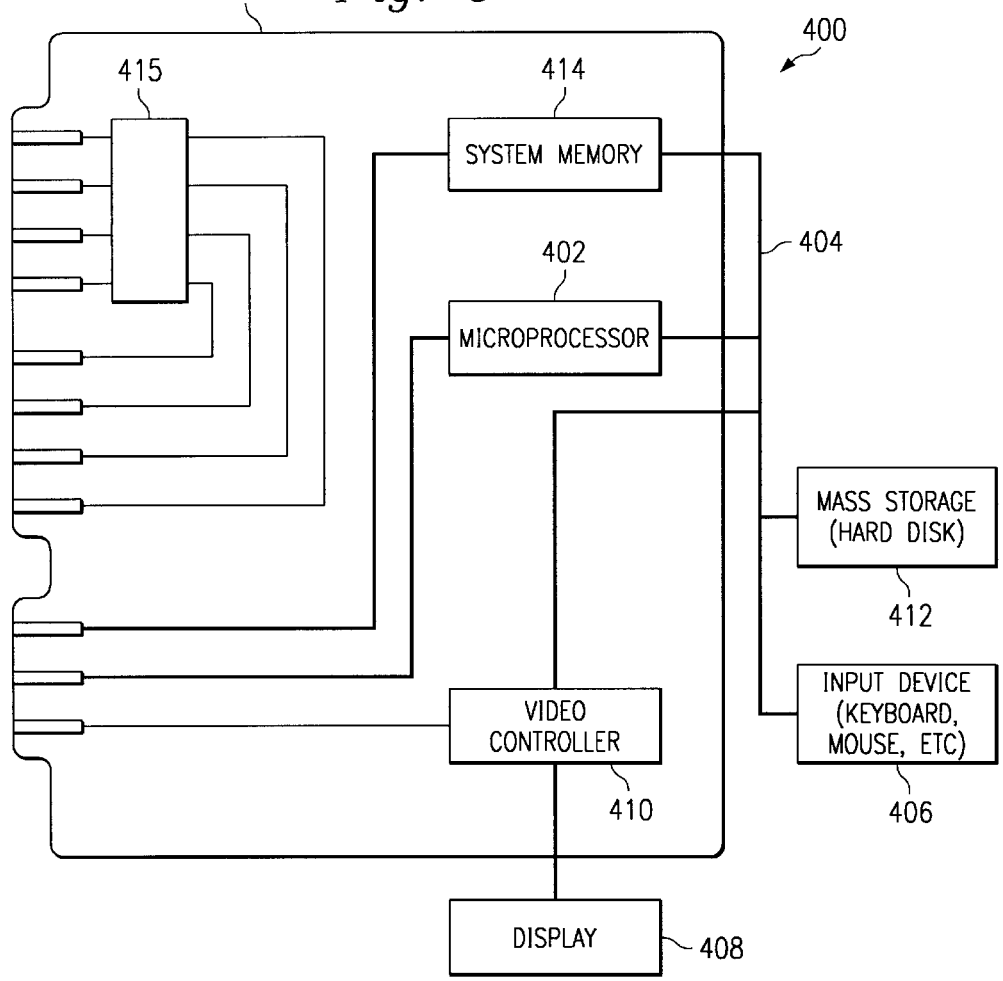

APPARATUS AND METHOD FOR ELECTRONICALLY ENCODING AN ARTICLE WITH WORK-IN-PROGRESS INFORMATION

BACKGROUND

The disclosures herein relate generally to computer systems and more particularly to an apparatus and method for electronically encoding an article with work-in-progress information.

The ability to track progression of the assembly and testing of an article relies upon the ability to track certain work-in-progress information. A printed circuit assembly illustrates one example of an article for which it is highly advantageous to track the work-in-progress information of various assembly operations and tests. Through the tracking of work-in-progress information, estimates of reliability and improvements in manufacturability of the printed circuit assembly, or other article, can be achieved.

Tracking the test progression of an electronic assembly, such as the printed circuit assembly, relies upon the electronic manufacturer having work-in-progress tracking capabilities. Those work-in-progress tracking capabilities vary from supplier site to supplier site and do not offer direct feedback to the customer. There is no technique commonly employed among electronic manufacturers for encoding work-in-progress information such that it can be manually checked as the assembly travels through the assembly and testing operations. Additionally, it is not currently possible to encode historical work-in-progress information on and retrieve it from a particular assembly once it has reached the customer's site.

Present techniques for tracking work-in-progress information of articles, including printed circuit assemblies, have several limitations. One limitation is that many of the present techniques are costly to implement. Consequently, the quantity of information captured is reduced to lower the cost. Another limitation is that many of the present techniques can retain only a limited amount of work-in-progress information. Such limitations adversely affect the ability to use work-in-progress information to estimate reliability and improve manufacturability.

Test progression of an electronic article has typically been tracked only by a major assembly process step. For example, an assembly process for printed circuit assemblies typically includes operations such as post wave solder touchup, automated visual inspection, low-level manufacturing defect analyzer, high-level in-circuit test, stress process (temperature cycling or vibration), at-speed functional test, and out of box audit (sampling testing).

Typically, a work-in-progress tracking system reads barcodes that are physically located on the assembly. The physical factory location of the assembly is recorded in a database. Sometimes, an assembly will fail one of the process steps for whatever reason and will need to be repaired and tests will need to be repeated. This presents a challenge to work-in-progress tracking software to ensure that the repeated tests actually occur. There is typically not an automated means of verifying that all of the test steps have occurred in the correct order, especially when a re-work operation has occurred.

U.S. Pat. No. 5,043,657 discloses a technique for "marking" integrated-circuit chips. When large lots of the chips are drift-tested at different temperatures, each chip can be individually identified and associated with the test data accumulated for the particular chip. Fabricating such a chip includes forming additional resistors on each chip with the resistors connected in series to a voltage supply. The resistors are trimmed at the wafer stage to produce voltages, at nodal points between the resistors, having magnitudes that uniquely identify each particular chip. In this manner, each such chip on a printed circuit assembly can be uniquely identified.

U.S. Pat. No. 5,003,251 discloses a barcode that is applied to a printed circuit assembly. The bar code is used for uniquely identifying the printed circuit assembly. When the printed circuit assembly undergoes testing and evaluation, the results are stored in computer memory along with an identification number. Subsequent to the time of testing, the original test data can be reviewed by scanning the barcode such that the results stored in the computer memory are accessed. The barcode may be permanently programmed into an LCD that is mounted on the printed circuit assembly, or may be permanently affixed to the printed circuit assembly on a label. Such a bar-coding system requires additional operations to be carried-out to facilitate correlating data to a particular barcode and for retrieving data associated with a particular barcode.

U.S. Pat. No. 4,437,229 discloses a hybrid integrated circuit package including a circuit assembly on which are formed thin film components of a circuit and to which is bonded at least one semiconductor chip. Prior to bonding the chip to the article, the circuit undergoes various tests and adjustment operations. An electric element, preferably a resistance element, is formed on the article. The element is functionally independent of the circuit. A first, initial value of the element marks the article as belonging to a first group of articles having first circuit characteristics. The initial value of the element is selectively altered to a second value upon a determination that the article has circuit characteristics other than those of the first group. In the described preferred embodiment the first group is a group of electrically acceptable articles, while other characteristics are those of defective articles. The mark is typically altered by a current of sufficient magnitude to burn portions of the element, or by selective application of radiant energy such as a laser beam. Identifying the altered mark permits articles having defective circuits thereon to be selectively eliminated from further processing. The elements are irreversibly altered such that previously used values cannot be reused.

U.S. Pat. No. 4,975,876 discloses a method for arranging a read memory for reading electrically updating status information from an integrated circuit that includes various circuit layers. A plurality of patterned circuit layers, commonly referred to as pattern layers, are produced from respective masks. Each pattern layer has provided therein a separate memory device, such that when changes are made in one such pattern, the updating status of the pattern layer can be written into the memory device in code form. The memory devices in the integrated circuit provide a read-only memory. The read-only memory is programmed so that each pattern layer having a memory device includes a code that is individual to its own updating status. The updating status code is written into the memory device at the same time that the code is written into a test device as reference information. When checking the integrated circuit, a test program in the test device reads the updating status of each pattern layer. The updating status is then compared with the reference information for determining the specific updating status of the integrated circuit. Accordingly, update status of the integrated circuit is coded, but work-in-progress information of an associated assembly is not.

The ability to effectively track present and historical work-in-progress information of an article is essential to estimating the reliability and improving the manufacturability of the article. Tracking only present work-in-progress information of the article limits the degree to which estimates of reliability and improvements in manufacturability can be attained. To make accurate estimation of the reliability of an article and to make significant improvements in the manufacturability of the article, it is necessary to retain present and historical work-in-progress information, regardless of the testing, re-work and repair operations conducted on the article during its manufacture and field use.

Therefore, what is needed is an apparatus and method for enabling an article to be electronically encoded with present and historical work-in-progress information that is associated with the assembly, testing, re-work and repair of the article.

SUMMARY

Accordingly, in one embodiment, present and historical work-in-progress information is electronically encoded on a status-encoding device attached to an article. To this end, a method is provided for electronically encoding an article with work-in-progress information. The method includes determining a work-in-progress condition of the article and setting an encoding device attached to the article to a set-point corresponding to the work-in-progress condition.

A principal advantage of this embodiment is that present and historical work-in-progress information of the article are used to effectively estimate the reliability and improve the manufacturability of the article.

BRIEF DESCRIPTION OF THE DRAWING FIGURES

FIGS. 3A and 3B are flow diagram views illustrating an embodiment of a method for encoding an article with work-in-progress information using a resistive encoding device.

FIGS. 4A and 4B illustrate an embodiment of a work-in-progress condition lookup table for correlating set-point resistance to the operability state of a printed circuit assembly.

FIG. 6 is a diagrammatic view illustrating an embodiment of a computer system having a printed circuit assembly with an encoding device thereon.

DETAILED DESCRIPTION

Figure 1:
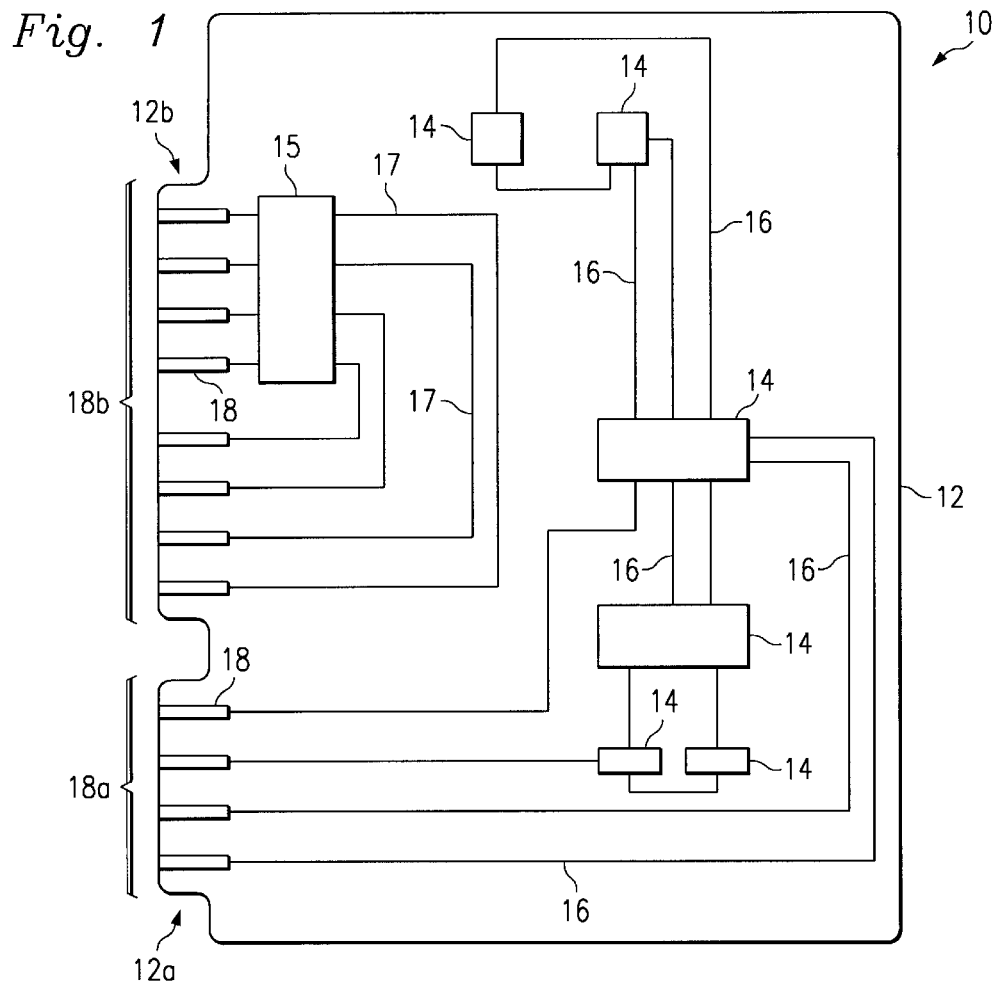
FIG. 1 is a diagrammatic view illustrating an embodiment of an encoding device mounted on a printed circuit assembly.

An embodiment of a printed circuit assembly 10 is illustrated in FIG. 1. The printed circuit assembly 10 illustrates one example of an article that is subjected to one or more work-in-progress evaluations during a manufacturing process. The printed circuit assembly 10 includes a printed circuit substrate 12 having a plurality of system components 14 and an encoding device 15 mounted thereon. Sockets, semiconductor devices, resistors, capacitors and the like illustrate examples of the system components 14.

A plurality of system traces 16 are attached to the printed circuit substrate 12. Each one of the system traces 16 is connected to at least one of the system components 14. A plurality of encoding device traces 17 are attached to the printed circuit substrate 12. Each one of the encoding device traces 17 is connected to the encoding device 15.

A plurality of contacts 18 are attached to the printed circuit substrate 12. A first set 18a of the contacts 18 are connected, directly or indirectly, to the plurality of system components 14. A second set 18b of contacts 18 are connected to the encoding device 15. The first set 18a of contacts 18 is located adjacent to a first edge portion 12a of the printed circuit substrate 12 and the second set of contacts 18 is located adjacent to a second edge portion 12b of the printed circuit substrate 12. As illustrated in FIG. 1, none of the encoding traces 17 are connected, directly or indirectly, to any of the system traces 16. In other embodiments (not shown) it may be advantageous for at least one of the encoding traces 17 to be connected to one or more of the system traces 16. In such other embodiments, an attached electronic apparatus, such as a computer, may communicate with the encoding device 15. The quantity and routing of the system traces 16 are for illustrative purposes only. In actual applications, several system traces 16 are typically connected to each one of the system components 14.

Figure 2:
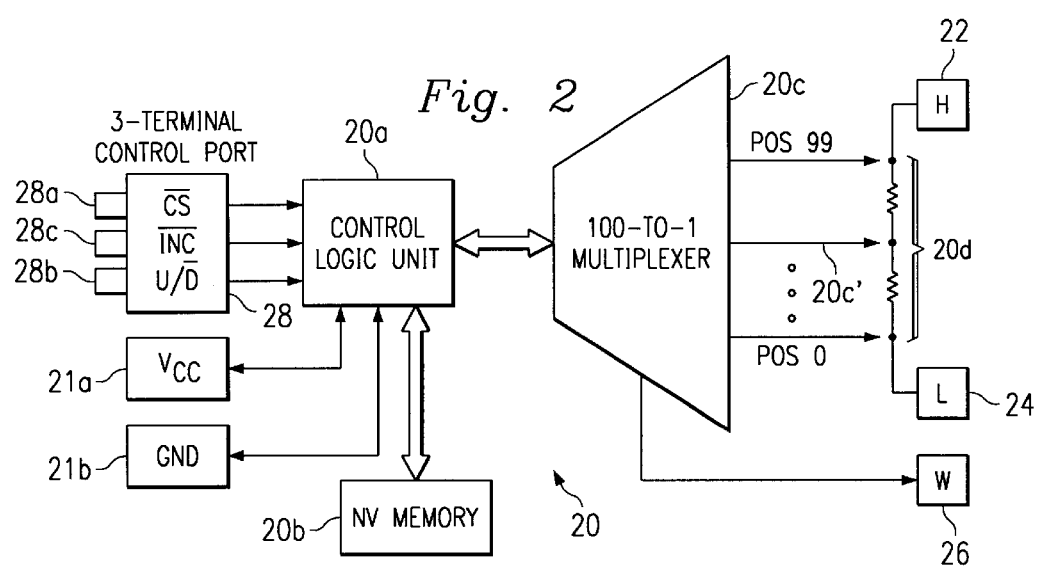
FIG. 2 is a block diagram view illustrating an embodiment of an encoding device for enabling work-in-progress information to be encoded.

An embodiment of a digitally controlled potentiometer 20 is illustrated in FIG. 2. Such a potentiometer is commercially available from Dallas Semiconductor Corporation under the part number DS1804. The digitally controlled potentiometer 20 illustrates one example of a suitable encoding device 15. One skilled in the art will contemplate other types of encoding devices, such as a capacitive device and a digital memory device.

The potentiometer 20 includes a control logic unit 20a connected to a non-volatile memory unit 20b and to a multiplexer unit 20c. A resistive element 20d is connected to the multiplexer unit 20c. A power supply terminal 21a and a ground terminal 21b are connected to the control logic unit 20a. The power supply and ground terminals 21a, 21b, are maintained at a supply voltage and ground voltage of a power supply unit (not shown) for providing power to the potentiometer 20. The power supply unit may be an integral or external battery, a stand-alone AC-to-DC device such as a commercially available 3-volt or 5-volt DC power supply, or may be integral with an apparatus such as, for example, a testing unit, encoding unit, or computer system.

The multiplexing unit 20c has a plurality of set-points (also commonly referred to as positions). The resistive element 20d exhibits an overall resistance. A resistance gradation of the potentiometer 20 is defined according to the number of set-points and the overall resistance of the resistive element 20d. For example, where the multiplexer unit 20c has 100 set-points and the resistive element 20d has an overall resistance of 100,000 ohms, the potentiometer 20 is gradated by 1000 (1K) ohm increments. Accordingly, in this example, a specific set-point of the potentiometer 20 is determined by dividing the desired resistance level of the resistance element 20d by 1000.

The resistance element 20d includes a high resistance terminal 22 and a low resistance terminal 24. The resistance level between the high and the low resistance terminals 22, 24, is equal to the overall resistance of the resistive element 20d. A set-point resistance, such as 1K ohms, 2K ohms, . . . 100K ohms), is accessible at a set-point resistance terminal 26 connected to a wiper 20c' of the multiplexer unit 20c. The non-volatile memory 20b provides for memory of the multiplexer set-point, and therefore the set-point resistance, when power is removed from the potentiometer 20. In this manner, the set-point resistance is retained when power is removed and then restored to the potentiometer 20. Furthermore, it is preferred that the set-point resistance of the encoding device 15, such as the potentiometer 20, be readable with or without power applied thereto.

A three-terminal control port 28 is connected to the control logic unit 20a. The control port 28 is used to adjust the set-point of the multiplexer unit 20c, thus adjusting the set-point resistance at the set-point resistance terminal 26. A first control port terminal 28a is used to activate and de-activate the control port 28. The control port 28 is activated while the first control port terminal 28a is at a low state. A second control port terminal 28b is used to select whether the set point is incremented or decremented. The set-point is incremented when the second control port terminal 28b is in a low state and is decremented when in a high state. A third control port terminal 28c is used to adjust the set-point of the multiplexer unit 20c. The set-point is decremented one set-point at a time when the first control port terminal 28a is low, the second control port terminal 28b is high and the third control port terminal 28c is transitioned from a high state to a low state. The set-point is incremented one set-point at a time when the first control port terminal 28a is low, the second control port terminal 28b is low and the third control port terminal 28c is transitioned from a high state to a low state.

Figure 3A:
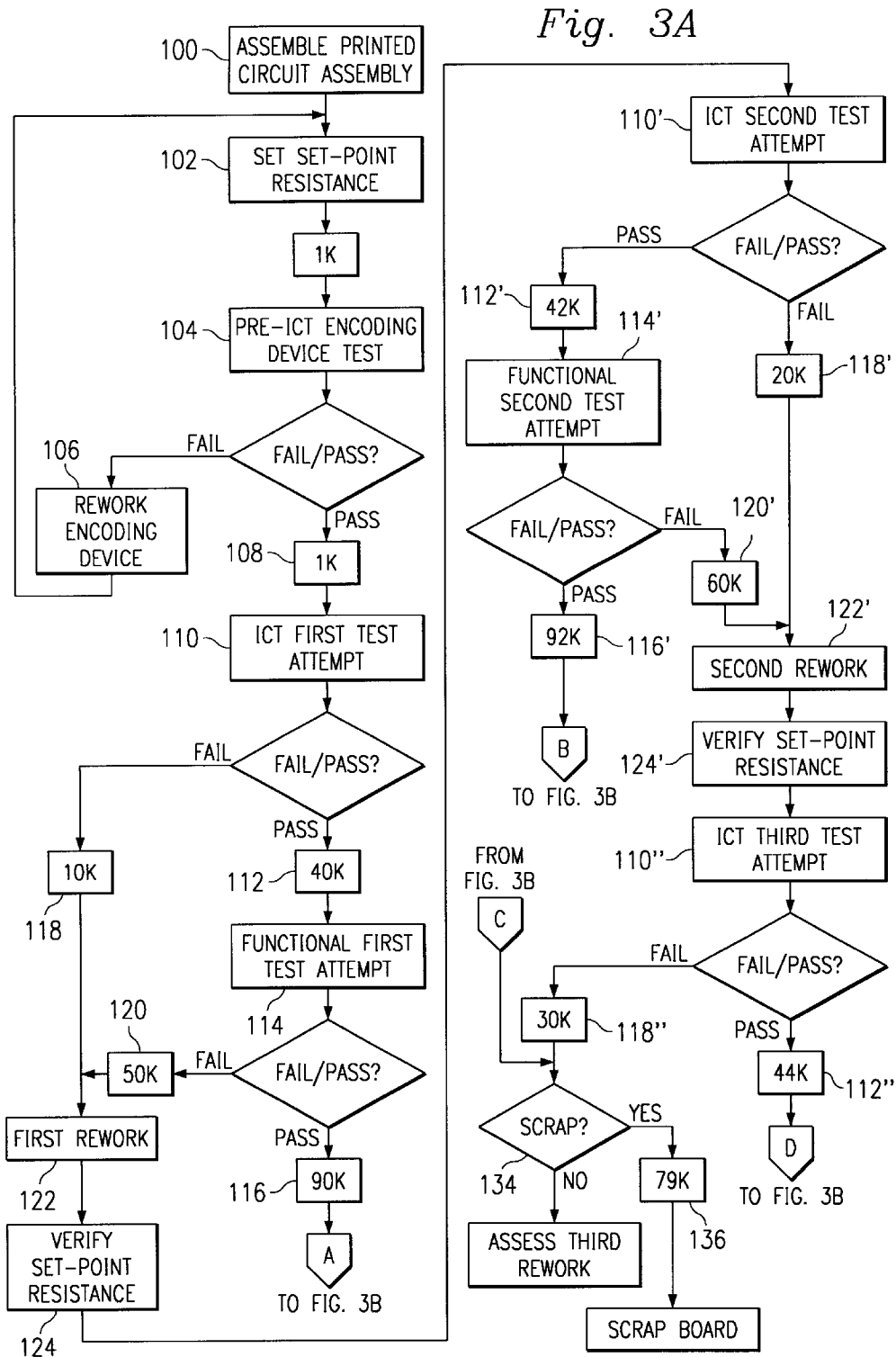

An embodiment of a method for encoding the printed circuit assembly 10, shown in FIG. 1, with work-in-progress information is illustrated in FIGS. 3A and 3B. At a step 100, the printed circuit assembly is assembled. Assembly of the printed circuit assembly includes mounting the encoding device 15, shown in FIG. 1, on the printed circuit substrate 12. In this embodiment of the method, the encoding device 15 includes a digitally controlled potentiometer having an overall resistance of 100K ohms and 100 set-points. Accordingly, the potentiometer is adjustable in 1000 ohm increments.

Following assembly of the printed circuit assembly, a plurality of work-in-progress (WIP) evaluations are performed to determine a particular WIP condition of the printed circuit assembly. The encoding device is adjusted to a set-point of a set-point set that identifies WIP conditions specific to the WIP evaluation being performed. Each set-point corresponds to a corresponding set-point resistance of the encoding device. The set-point resistance corresponds to a corresponding WIP condition of the printed circuit assembly that was determined during the specific WIP evaluation.

An embodiment of a WIP condition look-up table 200 for correlating resistance levels to various WIP conditions of the printed circuit assembly is illustrated in FIGS. 4A and 4B. The look-up table 200 includes a plurality of set-point sets S1, S2 . . . S6. Each set-point set identifies a plurality of resistance levels, also sometimes referred to as set-point resistance levels. Each resistance level corresponds to a particular set-point of the encoding device 15 and to a particular WIP condition of the printed circuit assembly. Although the look-up table 200 is configured specifically for WIP conditions associated with printed circuit assemblies, the overall structure, content and use of the look-up table 200 applies to an unlimited number of articles of manufacture.

An encoding set-point set S1 includes a plurality of resistance levels that correspond to various WIP conditions associated with the encoder device operation.

A first in-circuit test (ICT) set-point set S2 includes a plurality of resistance levels that correspond to various present and historic ICT failure conditions. A second ICT set-point set S3 includes a plurality of resistance levels that correspond to various ICT passing conditions, including the number of attempts required to pass the ICT.

A first automated functional test (AFT) set-point set S4 includes a plurality of resistance levels that correspond to various present and historic AFT failure conditions. A second AFT set-point set S5 includes a plurality of resistance levels that correspond to various AFT passing conditions, including the number of attempts required to pass the AFT.

A known good unit (KGU) set-point set S6 includes a plurality of resistance levels that correspond to historical WIP conditions under which the printed circuit assembly passed both the ICT and AFT. Each resistance level of the KGU set-point set S6 indicates the number of attempts required to pass both the ICT and the AFT. Any time a printed circuit assembly is re-worked, repaired or retested, the reliability is known to be adversely affected such that the risk of an early life failure is increased. Accordingly, the resistance levels of the KGU set-point set S6 may be used as an estimator of the reliability of the printed circuit assembly.

Referring again to FIG. 3A, the encoding device is set to a first resistance level of the encoding set-point set S1 at a step 102. The first resistance level of the encoding set-point set S1 defines a known set-point resistance, such as 1K ohms, for identifying that the printed circuit assembly is undergoing its first evaluation of the encoding device WIP condition. In addition to benefits associated with WIP tracking, it is desirable to set the encoding device to a known set-point resistance because the set point resistance of the encoding device as shipped by the manufacturer is typically unknown.

At a step 104, an encoding device test (EDT) is performed to determine the operability of the encoding device. In response to the encoding device failing the EDT at the step 104, the encoding device is reworked at a step 106. A rework operation is defined herein to mean that a system component of the printed circuit assembly, such as the encoding device, is replaced, repaired, reattached, or otherwise manipulated in an attempt to achieve proper operation. The method then continues at the step 102. However, after the first re-work operation is facilitated, the encoding device is set to a second resistance level of the encoding set-point set S1 at the step 102. The second resistance level of the encoding device WIP set-point set S1 indicates that the printed circuit assembly failed the first attempt of passing the EDT.

In response to the printed circuit assembly passing the EDT at the step 104, the resistance level of the encoding device is verified at a step 108. Prior to conducting any tests of the printed circuit assembly, it is desirable to verify the resistance level of the encoding device to ensure that the printed circuit assembly has passed the previous test or tests. In most manufacturing operations, it is undesirable to use test equipment and to expend time testing articles previously identified as being scrap or needing to be reworked. Accordingly, verifying the WIP condition of the article prior to testing can save time and money.

At a step 110, an in-circuit test (ICT) is performed in a first attempt of verifying proper operation of the individual system components of the printed circuit assembly. In response to the printed circuit assembly passing the ICT at the step 110, the encoding device is adjusted to a first resistance level of the second ICT set-point set S3 at a step 112. For example, adjusting the encoding device to 40K ohms, FIG. 4A, indicates that the printed circuit assembly passed the ICT on the first attempt.

At a step 114, an automated functional test (AFT) is performed in a first attempt of verifying proper operation of the entire printed circuit assembly. In response to the printed circuit assembly passing the AFT at the step 114, the encoding device is adjusted to a first resistance level of the second AFT set-point set S5 at a step 116. For example, adjusting the encoding device to 90K ohms, FIG. 4B, indicates that the printed circuit assembly passed the AFT on the first attempt.

In response to the printed circuit assembly failing the ICT on the first attempt at the step 110, the encoding device is adjusted to a first resistance level of the first ICT set-point set S2 at a step 118. The first resistance level of the first ICT set-point set S2 indicates that the printed circuit assembly failed the ICT on the first attempt. For example, adjusting the encoding device to 10K ohms, FIG. 4A, indicates that the printed circuit assembly failed the test probe nails test of the ICT on the first attempt.

In response to the printed circuit assembly failing the AFT on the first attempt at the step 114, the encoding device is adjusted to a first resistance level of the first AFT set-point set S4 at a step 120. The first resistance level of the first AFT set-point set S4 indicates that the printed circuit assembly failed the AFT on the first attempt. For example, adjusting the encoding device to 50K ohms, FIG. 4B, indicates that the printed circuit assembly exhibited a POST failure of the AFT on the first attempt.

At a step 122, the printed circuit board, identified as failing the ICT or the AFT on the first respective attempt, is reworked for a first time. After the previously defective printed circuit assembly has been re-worked, the resistance level is verified at the step 124 prior to further attempts at passing the ICT.

After the first re-work and successful resistance level verification, the printed circuit assembly is subjected to the ICT at the step 110' for a second attempt at passing. After the second attempt at passing the ICT is completed, the encoding device is adjusted to a second resistance level of the first ICT set-point set S2 at a step 118' in response to the printed circuit assembly failing the ICT. In response to the printed circuit assembly passing the ICT, the encoding device is adjusted to a second resistance level of the second ICT set-point set S3 at the step 112'

In response to the printed circuit assembly successfully passing the second ICT at the step 110', it is then subjected to the AFT at the step 114' for a second attempt at passing. After the second AFT is performed, the encoding device is adjusted to a second resistance level of the first AFT set-point set S4 at a step 120' in response the printed circuit assembly failing the AFT. In response to the printed circuit assembly passing the AFT, the encoding device is adjusted to a second resistance level of the second AFT set-point set S5 at the step 116'.

The second resistance level of the first ICT set-point set S2 and the second resistance level of the first AFT set-point set S4 each indicate that the printed circuit assembly failed the respective test on the second attempt. The second resistance level of the second ICT set-point set S3 and the second resistance level of the second AFT set-point set S4 each indicate that the printed circuit assembly passed the respective test on the second attempt.

At a step 122', the printed circuit board, having been identified as failing the ICT or the AFT on the respective second attempt, is reworked for a second time. After the previously defective printed circuit assembly has been re-worked, the resistance level of the encoding device is verified at the step 124' prior to further attempts at passing the ICT.

After the second re-work and successful resistance level verification, the printed circuit assembly is subjected to the ICT at the step 110" for a third attempt at passing. After the third attempt at passing the ICT is completed, the encoding device is adjusted to a third resistance level of the first ICT set-point set S2 at a step 118" in response the printed circuit assembly failing the ICT. In response to the printed circuit assembly passing the ICT, the encoding device is adjusted to a third resistance level of the second ICT set-point set S3 at the step 112".

In response to the printed circuit assembly successfully passing the second ICT at the step 110", it is then subjected to the AFT at the step 114", FIG. 3B, for a third attempt at passing. After the second AFT is performed, the encoding device is adjusted to a third resistance level of the first AFT set-point set S4 at a step 120" in response the printed circuit assembly failing the AFT. In response to the printed circuit assembly passing the AFT, the encoding device is adjusted to a third resistance level of the second AFT set-point set S5 at the step 116".

The third resistance level of the first ICT set-point set S2 and the third resistance level of the first AFT set-point set S4 each indicate that the printed circuit assembly failed the respective test on the third attempt. The third resistance level of the second ICT set-point set S3 and the third resistance level of the second AFT set-point set S4 each indicate that the printed circuit assembly passed the respective test on the third attempt.

At a step 126, the resistance level of the encoding device is verified in response to the printed circuit assembly passing both the ICT and AFT. After successful verification of the resistance level, a hot mock-up functional test (HMUFT) is performed at the step 128. The HMUFT includes testing the printed circuit assembly as an assembled unit.

In response to the printed circuit assembly passing the HMUFT at the step 128, the printed circuit assembly is packaged and shipped at the step 130 to a point of assembly of a corresponding electronic device, such as a computer system. In response to the printed circuit assembly failing the HMUFT, the printed circuit assembly is assessed at the step 132 to determine if additional rework is justified.

At a step 134, FIG. 3A, in response to the printed circuit assembly not passing the ICT and the AFT after three attempts, a determination is made whether to scrap the printed circuit assembly or whether additional re-work is justified. If the determination is made to scrap the printed circuit assembly, the encoding device is adjusted to a fourth resistance level of the second AFT set-point set at a step 136, indicating that the board has been scrapped.

Figure 5:
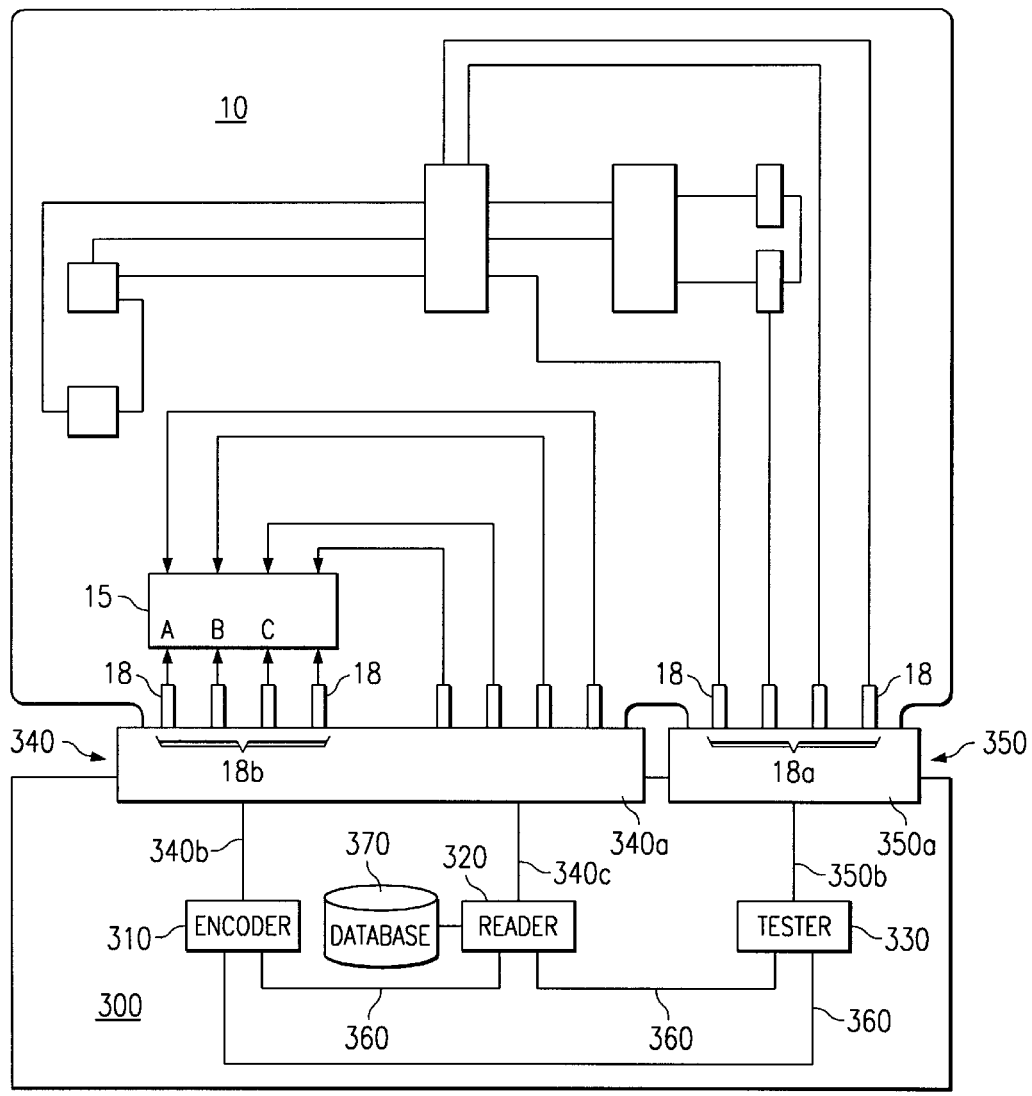
FIG. 5 is a diagrammatic view illustrating an embodiment of an apparatus for encoding a printed circuit assembly with work-in-progress information.

An embodiment of an apparatus 300 for encoding an article of manufacture, such as the printed circuit assembly 10, with work-in-progress information is illustrated in FIG. 5. The apparatus 300 includes an encoder 310, a reader 320 and a tester 330. The encoder 310 and the reader 320 are connected to the encoding device 15 of the printed circuit assembly through an encoding device cable assembly 340. The tester 330 is connected to the printed circuit assembly 15 through a tester cable assembly 350.

The encoding device cable assembly 340 includes an encoder device connector 340a, an encoder cable 340b and a reader cable 340c. The encoding device connector 340a attaches to a mating portion of the printed circuit assembly 10. The encoder cable 340b is attached between the encoder 310 and the encoder device connector 340a. The reader cable 340c is attached between the reader 320 and the encoder device connector 340a. The encoding device connector 340a engages the second set 18b of contacts 18, enabling information to be read from and communicated to the encoding device 15.

The tester cable assembly 350 includes a tester connector 350a and a tester cable 350b. The tester connector 350a is attached to a mating portion of the printed circuit assembly 10. The tester cable 350b is attached between the tester 330 and the tester connector 350a. The tester connector 350a engages the first set 18a of contacts 18, enabling tests such as the ICT and AFT to be performed on the printed circuit assembly 10.

The encoder 310, reader 320 and tester 330 are coupled together by a plurality of interface cable assemblies 360. It is advantageous for the encoder 310, reader 320 and the tester 330 to be coupled such that information may be shared in a real-time manner. In another embodiment (not shown), the encoder 310 is integral with the reader 320. In still another embodiment (not shown), the encoder 310 is integral with the tester 330.

The encoder 310 communicates an electrical signal or mechanical input to the encoding device 15 for initiating a change in the set-point of the encoding device 15. For example, where the encoding device 15 is a digital potentiometer, the encoder 310 generates a change in voltage at an indexing terminal A, FIG. 5, of the encoding device 15. The encoding device controls the voltage provided to an increment/decrement terminal B of the encoding device 15 and to an actuating terminal C of the encoding device 15. By controlling the voltage, the encoding device can be set to increment or decrement through the set-points of the encoding device.

A key aspect of embodiments of the encoding device 15 disclosed herein is the ability to increment and decrement through the encoding device 15. This ability permits each set-point of the encoding device 15 to be repeatedly selected. The ability to repeatedly select each set-point of the encoding device 15 permits the disclosed method of encoding an article with WIP information, FIGS. 3A and 3B, to be accomplished.

The reader 320 measures the output value of the encoding device 15. For example, where the encoding device 15 is a digital potentiometer, the reader 320 measures the resistance level of the encoding device 15.

A database 370 is coupled to the encoder 310 and to the reader 320. The database 370 contains stored information, including the WIP condition look-up table 200 discussed above in reference to FIGS. 4A and 4B. The encoder 310 accesses the WIP look-up table 200 in the database 370 such that the encoder device 15 can be adjusted to a desired resistance level. The reader 320 accesses the WIP look-up table 200 in the database 370 for matching a measured resistance level of the encoder device 15 with a corresponding WIP condition.

The database 370 may reside on a number of different types of storage devices. Examples of storage devices include a memory device integral with the apparatus 300, a memory device integral with the reader, a memory device integral with the encoder, a remote computer system coupled to the apparatus 300 through a global computer network such as the Internet, and other suitable memory device configurations.

The tester 330 facilitates tests of the printed circuit assembly 10, such as the in-circuit test and automated functional test. Examples of commercially available testers include a tester offered by GenRad Incorporated under the model number GR2286 and a tester offered by TeraDyne Incorporated under model number Z1803.

An embodiment of a computer system 400 is illustrated in FIG. 6. The computer system 400 includes at least one microprocessor 402. The microprocessor 402 is connected to a bus 404. The bus 404 serves as a connection between the microprocessor 402 and other components of the computer system 400. An input device 406 is coupled to the microprocessor 402 to provide input to the microprocessor 402. Examples of input devices include keyboards, touchscreens, and pointing devices such as a mouse, a trackball and a trackpad. The computer system 400 may also include a display 408, which is coupled to the microprocessor 402 typically by a video controller 410. Programs and data are stored on a mass storage device 412 that is coupled to the microprocessor 402. Mass storage devices include components such as hard disks, optical disks, magneto-optical drives, floppy drives, and the like. A system memory 414 provides the microprocessor 402 with fast storage to facilitate execution of computer programs by the microprocessor 402. It should be understood that other busses and intermediate circuits could be employed between the components described above and microprocessor 402 to facilitate interconnection between the components and the microprocessor 402.

Still referring to FIG. 6, computer system 400 includes a motherboard 416. A plurality of system components of the computer system 400, such as the microprocessor 402, video controller 410 and system memory 414, are attached to the motherboard 416. An encoding device 415 is mounted on the motherboard 416 for enabling the motherboard 416 to be encoded with work-in-progress information. The encoding device 415 is not electrically connected to any of the system components attached to the motherboard 416.

Tracking only present work-in-progress information of the article limits the degree to which estimates of reliability and improvements in manufacturability can be attained. To make an accurate estimation of the reliability of an article and to make significant improvements in the manufacturability of the article, it is necessary to retain present and historical work-in-progress information, regardless of the testing, re-work and repair operations conducted on the article during its manufacture and field use.

The encoding device enables an article to be electronically encoded with present and historical work-in-progress information. The work-in-progress information provides insight into the assembly, testing, re-work and repair of the article. The encoding device permits present and historical WIP information of the article to be effectively tracked.

The WIP information can be used for a variety of purposes. The WIP information can be structured such that the reliability of the article can be estimated by tracking the number of rework operations completed. Tracking of re-work operations also provides a means of improving manufacturability of the article.

Printed circuit assemblies illustrate one example of articles that benefit from using the encoding device and WIP conditions to estimate reliability. It is known that printed circuit assemblies requiring no re-work to pass ICT and AFT provide a lower risk of failure than those that required one or more re-work operations to pass ICT and AFT. The encoding device may be used for determining the degree of re-work each printed circuit board in a batch has undergone. Printed circuit assemblies that have no re-work may be sorted for use in high reliability applications. This sorting technique applies to any article for which it is desirable to identify and sort high reliability articles from a batch of the articles.

The method and apparatus disclosed herein may be used to secure data for evaluating the effect that re-work has on the reliability of an article. For example, a barcode is often applied to a printed circuit assembly for allowing the printed circuit assembly to be tracked during its manufacture and use. The barcode is scanned at various steps in the manufacturing process, such as the AFT, re-work operations, etc. Various data associated with the various steps is recorded in a results database. Should the printed circuit assembly fail while in use, the barcode of the failed unit can be matched with the corresponding test data in the results database. In this manner, the WIP information captured on the encoding device and the test data are used to quantitatively evaluate the effect of re-work on the reliability of the article.

As a result, one embodiment provides a method for electronically encoding an article with work-in-progress information. The method includes determining a work-in-progress condition of the article and setting an encoding device attached to the article to a set-point corresponding to the work-in-progress condition.

Another embodiment provides an apparatus for electronically encoding an article with work-in-progress information. The apparatus includes a tester for determining a work-in-progress condition of an article, and an encoder for reversibly setting an encoding device attached to the article to a set-point corresponding to the work-in-progress condition.

A further embodiment provides a computer system including a printed circuit assembly having a microprocessor attached thereto. An input is coupled to provide input to the microprocessor. A video controller and a mass storage are coupled to the microprocessor. A system memory is coupled to provide storage to facilitate execution of computer programs by the microprocessor. An encoding device is electrically connected to the printed circuit assembly and is operable at a plurality of set-points. Each set-point corresponds to a respective work-in-progress condition of the printed circuit assembly.

As it can be seen, the embodiments presented herein provide several advantages. The present and historical work-in-progress information of the article are used to effectively estimate the reliability and improve the manufacturability of the article. Test and re-work history of the article is cost-effectively tracked. The work-in-progress conditions that may be encoded on the encoding device may be updated in the database, without requiring changes to the encoding device. The installed cost of the encoding devices is relatively low. The reliability of the article is determined directly from the set-point of the encoding device. The encoding device may be used to facilitate sorting articles having a particular characteristic from a batch of the articles.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for electronically encoding an article with work-in-progress information, comprising:
   providing an article;
   attaching an encoding device to the article, the device being settable by an automated tester, the encoding device controlling voltage provided to an increment/decrement terminal of the encoding device and to an actuating terminal of the encoding device;
   determining a work-in-progress condition of the article; and
   setting the encoding device attached to the article to a set-point corresponding to the work-in-progress condition, the device retaining its settings even without power applied thereto.

2. The method of claim 1 wherein the determining the work-in-progress condition includes the identifying a present work-in-progress condition and at least one historical work-in-progress condition of the article.

3. The method of claim 1 wherein the setting includes adjusting an electrical resistance of the encoding device from a first resistance level to a second resistance level.

4. The method of claim 1, further comprising:
   assigning a work-in-progress condition including present and historical work-in-progress events to a set-point of the encoding device.

5. The method of claim 4 wherein the assigning includes:
   defining a plurality of work-in-progress conditions including present and historical work-in-progress events;
   defining a plurality of set-points; and
   correlating each one of the work-in-progress conditions to a corresponding one of the set-points.

6. The method of claim 1 wherein the setting includes:
   adjusting the encoding device from a first set-point of a first set-point set to a second set-point of the first set-point set in response to failing a first work-in-progress evaluation; and
   adjusting the encoding device from a set-point of the first set-point set to a set-point of a second set-point set in response to passing the first work-in-progress evaluation.

7. The method of claim 1 wherein the setting includes:
   adjusting the encoding device from a first set-point of a first set-point set to a first set-point of a second set-point set in response to passing a first work-in-progress evaluation; and
   adjusting the encoding device from the first set-point of the second set-point set to a second set-point of the first set-point set in response to failing a second work-in-progress evaluation after passing the first work-in-progress evaluation.

8. The method of claim 1 wherein the setting includes:
   connecting the article to the tester;
   conducting a work-in-progress evaluation of the article; and
   adjusting the encoding device from a first set-point to a second set-point.

9. The method of claim 8 wherein the adjusting includes indexing an electrical resistance of the encoding device from a first resistance level to a second resistance level.

10. The method of claim 8, further comprising:
    identifying the first set-point of the encoding device prior to adjusting the encoding device to the second set-point.

11. The method of claim 8 wherein the adjusting includes communicating an electrical signal from an encoder to the encoding device, the electrical signal corresponding to the work-in-progress condition.

12. An apparatus for electronically encoding an article with information during assembly and/or testing, comprising:
   an article;
   an encoding device attached to the article, the device being settable by an automated tester, the encoding device controlling voltage provided to an increment/decrement terminal of the encoding device and to an actuating terminal of the device;
   a tester for determining a work-in-progress condition of the article; and
   an encoder for reversibly setting the encoding device attached to the article to a set-point corresponding to the work-in-progress condition, the device retaining its settings even without power applied thereto.

13. The apparatus of claim 12 wherein the encoder includes a set-point adjusting device for changing the set-point from:
   a first set-point of a first set-point set to a second set-point of the first set-point set when a first work-in-progress evaluation is failed;
   a set-point of the first set-point set to a set-point of a second set-point set when the first work-in-progress evaluation is passed; and
   a set-point of the second set-point set to a set-point of the first set-point set when a second work-in-progress evaluation is failed after the first work-in-progress evaluation is passed.

14. The apparatus of claim 12 wherein the encoder adjusts an electrical resistance of the encoding device from a first resistance level to a second resistance level.

15. The apparatus of claim 12 wherein the encoding device is adjusted from:
   a first set-point of a first set-point set to a second set-point of the first set-point set when a first work-in-progress evaluation is failed; and
   a set-point of the first set-point set to a set-point of a second set-point set when the first work-in-progress evaluation is passed.

16. The apparatus of claim 12 wherein the encoding device is adjusted from:
   a first set-point of a first set-point set to a first set-point of a second set-point set when a first work-in-progress evaluation is passed; and
   the first set-point of the second set-point set to a second set-point of the first set-point set when a second work-in-progress evaluation is failed after passing the first work-in-progress evaluation.

17. The apparatus of claim 12 wherein the encoder is integral with the tester used for determining the work-in-progress condition of the article.

18. The apparatus of claim 12 wherein the encoder indexes an electrical resistance of the encoding device from a first resistance level to a second resistance level.

19. The apparatus of claim 12 wherein the encoder communicates an electrical signal to the encoding device, the electrical signal corresponding to the work-in-progress condition.

20. A computer system, comprising:
   a printed circuit assembly including a microprocessor attached thereto;
   an input coupled to provide input to the microprocessor;
   a mass storage coupled to the microprocessor;
   a system memory coupled to provide storage to facilitate execution of computer programs by the microprocessor; and
   an encoding device electrically connected to the printed circuit assembly for controlling voltage provided to an increment/decrement terminal of the encoding device and to an actuating terminal of the encoding device and being operable at a plurality of set-points, each set-point corresponding to a respective work-in-progress condition of the printed circuit assembly.

21. The computer system of claim 20 wherein the encoding device is adjusted from:
   a first set-point of a first set-point set to a second set-point of the first set-point set when a first work-in-progress evaluation is failed;
   a set-point of the first set-point set to a set-point of a second set-point set when the first work-in-progress evaluation is passed; and
   a set-point of the second set-point set to a set-point of the first set-point set when a second work-in-progress evaluation is failed after the first work-in-progress evaluation is passed.

22. The computer system of claim 20 wherein the encoding device includes a digitally controlled potentiometer.

23. The computer system of claim 22 wherein the potentiometer includes a non-volatile resistance memory.

24. The computer system of claim 20 wherein each one of the set-points is electronically selectable.

25. The computer system of claim 20 wherein each one of the set-points is repeatedly selectable.

* * * * *